United States Patent
Choi et al.

(12)

(10) Patent No.: US 6,221,275 B1
(45) Date of Patent: Apr. 24, 2001

(54) ENHANCED HEAT TRANSFER USING NANOFLUIDS

(75) Inventors: Stephen U. S. Choi, Lisle; Jeffrey A. Eastman, Naperville, both of IL (US)

(73) Assignee: University of Chicago, Chicago, IL (US)

( * ) Notice: Subject to any disclaimer, the term of this patent is extended or adjusted under 35 U.S.C. 154(b) by 0 days.

(21) Appl. No.: 09/199,002

(22) Filed: Nov. 24, 1998

Related U.S. Application Data

(60) Provisional application No. 60/066,487, filed on Nov. 24, 1997.

(51) Int. Cl.$^7$ ................................. C09K 5/10; B01F 3/12
(52) U.S. Cl. ........................ 252/74; 165/104.19; 516/33
(58) Field of Search .............................. 516/33; 252/74; 165/104.19; 257/714

(56) References Cited

U.S. PATENT DOCUMENTS

| | | | |
|---|---|---|---|
| 3,180,835 | * 4/1965 | Peri | 516/33 |
| 5,147,841 | * 9/1992 | Wilcoxon | 516/33 X |

FOREIGN PATENT DOCUMENTS

4131516A1    4/1993 (DE) .

OTHER PUBLICATIONS

Hidetoshi Masuda et al., "Alteration of Thermal Conductivity and Viscosity of Liquid by Dispersing Ultra–Fine Particles (Dispersion of $Al_2O_3$, $SiO_2$, and $TiO_2$ Ultra–Fine Particles)", Netsu Bussei 7 (4) (1993) 227–233.

Stephen U.S. Choi, "Enhancing Thermal Conductivity of Fluids with Nanoparticles", *Developments and Applications of Non–Newtonian Flows*, eds. D.A. Siginer et al., The American Society of Mechanical Engineers, New York, FED–Fol. 231/MD–vol. 66, pp. 99–105 (Nov. 1995).

Shinpyo Lee et al., "Application of Metallic Nanoparticle Suspensions in Advanced Cooling Systems", *Recent Advances in Solids/Structures and Application of Metallic Materials*, eds. Y. Kwon et al., The American Society of Mechanical Engineers, New York, PVP–vol. 342/MD–vol. 72, pp. 227–234 (Nov. 1996).

J.A. Eastman et al., "Enhanced Thermal Conductivity Through the Development of Nanofluids", Submitted to the Proceedings of the Symposium on Nanophase and Nanocomposite Materials II, Mat. Res. Soc. 1996 Fall Meeting, Boston, MA (Dec. 1996).

"New Nanofluids Increase Heat Transfer Capability", Tech Transfer Highlights vol. 8, No. 2, (1997).

M. Wagener et al., "Preparation of Metal Nanosuspensions by High–Pressure DC–Sputtering on Running Liquids", Mat. Res. Soc. Symp. Proc. vol. 457 (1997) pp. 149–154.

* cited by examiner

*Primary Examiner*—Richard D. Lovering
(74) *Attorney, Agent, or Firm*—Michael D. Rechtin; Foley & Lardner

(57) ABSTRACT

This invention is directed to a method of and apparatus for enhancing heat transfer in fluids such as deionized water. ethylene glycol, or oil by dispersing nanocrystalline particles of substances such as copper, copper oxide, aluminum oxide, or the like in the fluids. Nanocrystalline particles are produced and dispersed in the fluid by heating the substance to be dispersed in a vacuum while passing a thin film of the fluid near the heated substance. The fluid is cooled to control its vapor pressure.

6 Claims, 4 Drawing Sheets

ENHANCED HEAT TRANSFER USING NANOFLUIDS

This application claims priority based on provisional application Ser. No. 60/066,487, filed Nov. 24, 1997.

This invention was made with Government support under Contract No. W-31-109-ENG-38 by the Department of Energy. The Government has certain rights in this invention.

BACKGROUND OF THE INVENTION

This invention is directed to a method of enhancing heat transfer in fluids and to fluids embodying means for enhancing heat transfer. In particular, it is a method of increasing heat transfer in fluids by dispersing nanoconducting particles in the fluids, and it is fluids containing dispersed nanoconducting particles.

Despite considerable previous research and development focusing on industrial heat transfer requirements, major improvements in cooling capabilities have been held back because of a fundamental limit in the heat transfer properties of conventional fluids. It is well known that metals in solid form have orders-of-magnitude larger thermal conductivities than those of fluids. For example, the thermal conductivity of copper at room temperature is about 700 times greater than that of water and about 3000 times greater than that of engine oil or pump oil, as shown in Table 1. The thermal conductivities of metallic liquids are much larger than those of nonmetallic liquids. Therefore, fluids containing suspended solid metallic particles are expected to display significantly enhanced thermal conductivities relative to conventional heat transfer fluids.

Low thermal conductivity is a primary limitation in the development of energy-efficient heat transfer fluids required in many industrial applications. To overcome this limitation, a new class of heat transfer fluids called nanofluids has been developed by suspending nanocrystalline particles in liquids such as water, oil, or ethylene glycol. The term nanocrystal is defined to mean a particle having a major dimension of less than 100 nanometers. For a spherical particle, the major dimension is the diameter of the sphere; for particles that are not spherical, the major dimension is the longest dimension. The resulting nanofluids possess extremely high thermal conductivities compared to the liquids without dispersed nanocrystalline particles. For example, 5 volume % of nanocrystalline copper-oxide particles suspended in water results in an improvement in thermal conductivity of almost 60% compared to water without nanoparticles. Excellent suspension properties are also observed, with no significant settling of nanocrystalline oxide particles occurring in stationary fluids over time periods longer than several days. Direct evaporation of copper nanoparticles into pump oil results in similar improvements in thermal conductivity compared to oxide-in-water systems, but importantly, requires far smaller concentrations of dispersed nanocrystalline powder.

Numerous theoretical and experimental studies of the effective thermal conductivity of dispersions containing particles have been conducted since Maxwell's theoretical work was published more than 100 years ago. However, all previous studies of the thermal conductivity of suspensions have been confined to those containing millimeter- or micron-sized particles. Maxwell's model shows that the effective thermal conductivity of suspensions containing spherical particles increases with the volume fraction of the solid particles. It is also known that the thermal conductivity of suspensions increases with the ratio of the surface area to volume of the particle. Using Hamilton and Crosser's model, we have calculated that, for constant particle size, the thermal conductivity of a suspension containing large particles is more than doubled by decreasing the sphericity of the particles from a value of 1.0 to 0.3 (the sphericity is defined as the ratio of the surface area of a particle with a perfectly spherical shape to that of a non-spherical particle with the same volume). Since the surface area to volume ratio is 1000 times larger for particles with a 10 nm diameter than for particles with a 10 mm diameter, a much more dramatic improvement in effective thermal conductivity is expected as a result of decreasing the particle size in a solution than can obtained by altering the particle shapes of large particles.

SUMMARY OF THE INVENTION

It is therefore an object of the invention to provide an improved method of enhancing heat transfer in fluids.

It is a further object of the invention to provide improved fluids having enhanced properties of heat transfer due to the dispersion in the fluids of nanoparticles of conducting solids.

It is a further object of the present invention to provide an improved method of introducing to a fluid particles having thermal conductivities higher than the thermal conductivity of the fluid.

It is a further object of the present invention to provide an improved fluid having enhanced thermal conductivity due to the dispersion in the fluid of thermally conducting nanoparticles.

These and other objects, advantages and features of the invention will become apparent from the following detailed description when taken in conjunction with the accompanying drawings.

DETAILED DESCRIPTION OF THE INVENTION

Figure 1:
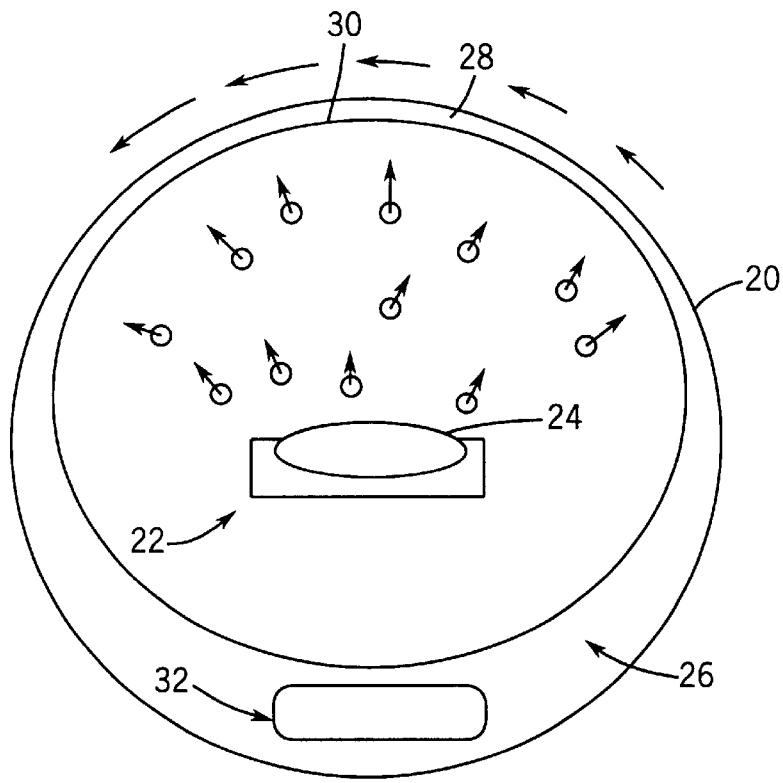
FIG. 1 is a schematic diagram of an apparatus for the practice of the present invention.

FIG. 1 is a schematic diagram of an apparatus for the practice of the present invention. In FIG. 1, nanocrystalline particles are produced by direct evaporation into a low vapor pressure liquid. A cylinder 20 is subjected to a vacuum. The cylinder 20 contains a heatable crucible 22 that heats the substance 24 to be vaporized. The cylinder 20 containing the liquid 26 to be treated is rotated to transport a thin layer 28 of the liquid 26 on the surface 30. The liquid 26 is cooled by a cooling system 32 to keep the liquid 26 from increasing the vapor pressure inside the cylinder 20.

Two procedures were used in synthesizing nanofluids for this investigation. In the first, nanocrystalline powders were prepared by the gas condensation (IGC) process and then were subsequently dispersed in deionized water. Nanocrystalline Cu and $Al_2O_3$ powders were produced at Argonne National Laboratory (Argonne, Ill.), while nanocrystalline CuO and additional $Al_2O_3$ powder were purchased. No special procedures were required to form stable suspensions of commercial oxide powders in water. Difficulties in dispersing Cu and $Al_2O_3$ powders synthesized at Argonne will be described below. Transmission electron microscopy was used to characterize particle sizes and agglomeration behavior.

To successfully produce a nanofluid with dispersed nanocrystalline Cu particles, a second preparation method was used based on the vacuum evaporation of particles onto a running oil substrate (VEROS) technique of Yatsuya et al. With this technique, nanocrystalline particles are produced by direct evaporation into a low vapor pressure liquid. The system built at Argonne, as shown in FIG. 1, was based on a modification of the VEROS technique and is similar to an earlier design by Günther and co-workers at the Fraunhofer Institute for Applied Materials Research in Bremen. With the system shown schematically in FIG. 1, nanocrystalline Cu was evaporated resistively into two types of pump oil. These oils were chosen because they are designed for vacuum applications and thus have extremely low vapor pressures. Low vapor pressures are required with the VEROS technique to prevent vaporization of the liquid during the evaporation process.

Figure 2:
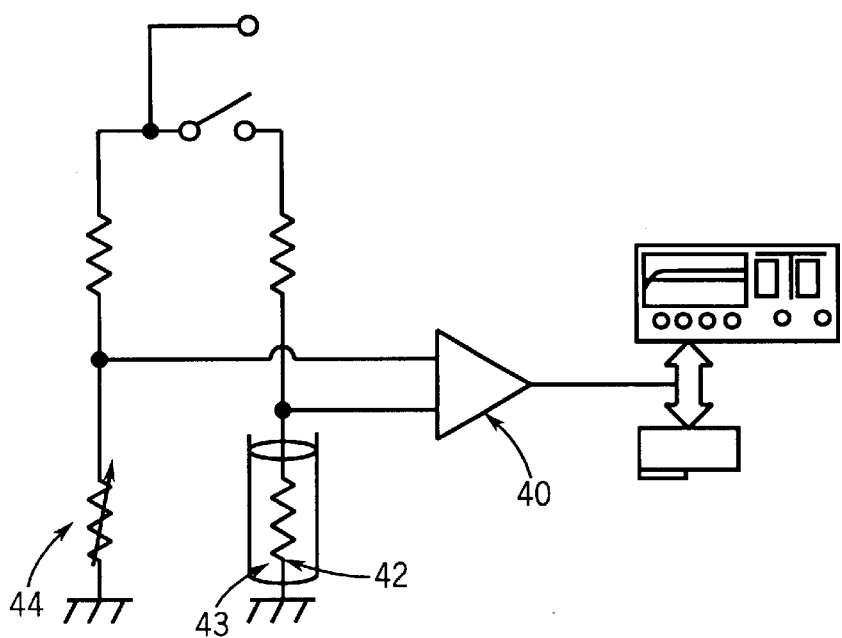
FIG. 2 is a schematic diagram of a transient hot-wire apparatus for measuring thermal conductivities of nanofluids.

FIG. 2 is a schematic diagram of a transient hot-wire apparatus for measuring thermal conductivities of nanofluids. In FIG. 2, a differential amplifier 40 compares voltages across a heated wire 42 in a nanofluid 43 with a similar heated wire 44 in air. The difference is related to the thermal conductivity of the nanofluid.

Figure 3:
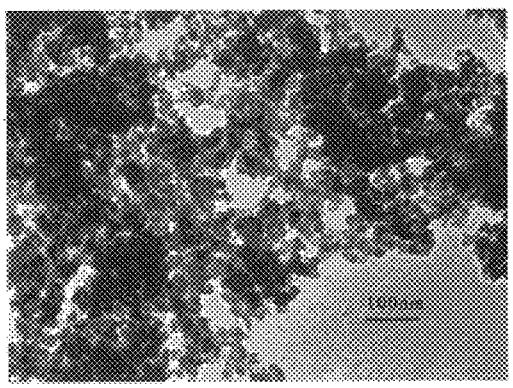
FIG. 3 is a photomicrograph of nanocrystalline copper.
Figure 4:
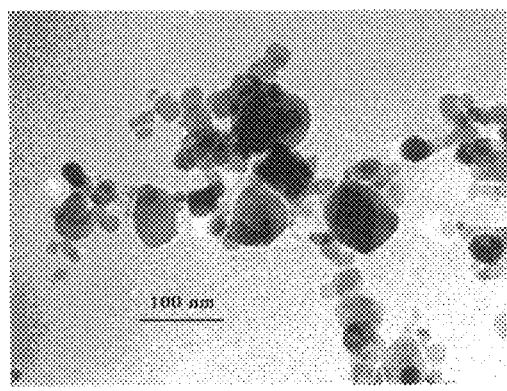
FIG. 4 is a photomicrograph of nanocrystalline copper oxide.

FIG. 3 is a bright field TEM photomicrograph of nanocrystalline copper and FIG. 4 is a bright-field TEM photomicrograph of nanocrystalline copper oxide, both produced by condensation of gases. The copper in FIG. 3 shows an average grain size of about 18 nanometer compared to about 36 nanometer for the copper oxide in FIG. 4, but the agglomerate sizes in FIG. 4 can be seen to be smaller, causing it to form more stable dispersions in deionized water.

Figure 5:
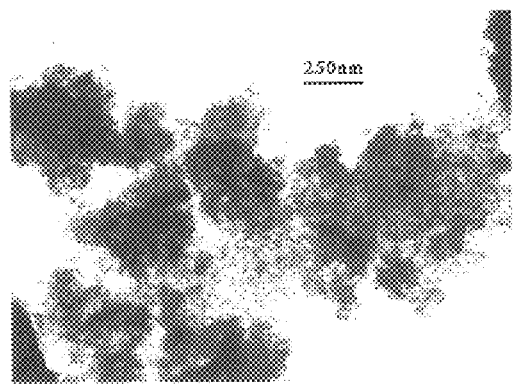
FIG. 5 is a photomicrograph of nanocrystalline aluminum oxide.
Figure 6:
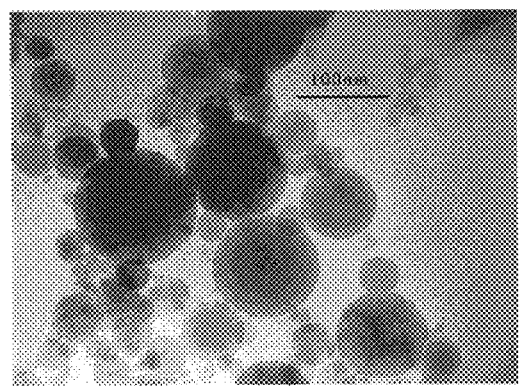
FIG. 6 is a photomicrograph of commercially-obtained copper oxide.

FIG. 5 is a photomicrograph of nanocrystalline aluminum oxide produced by the process of the present invention and FIG. 6 is a photomicrograph of commercially-obtained copper oxide. The scale figure in FIG. 5 is 250 nanometer and the average grain size is less than 3 nanometer, while the commercially-obtained product has an average grain size of 33 nanometer. Thus, the commercial product settles out of dispersion faster than that of the present invention.

Figure 7:
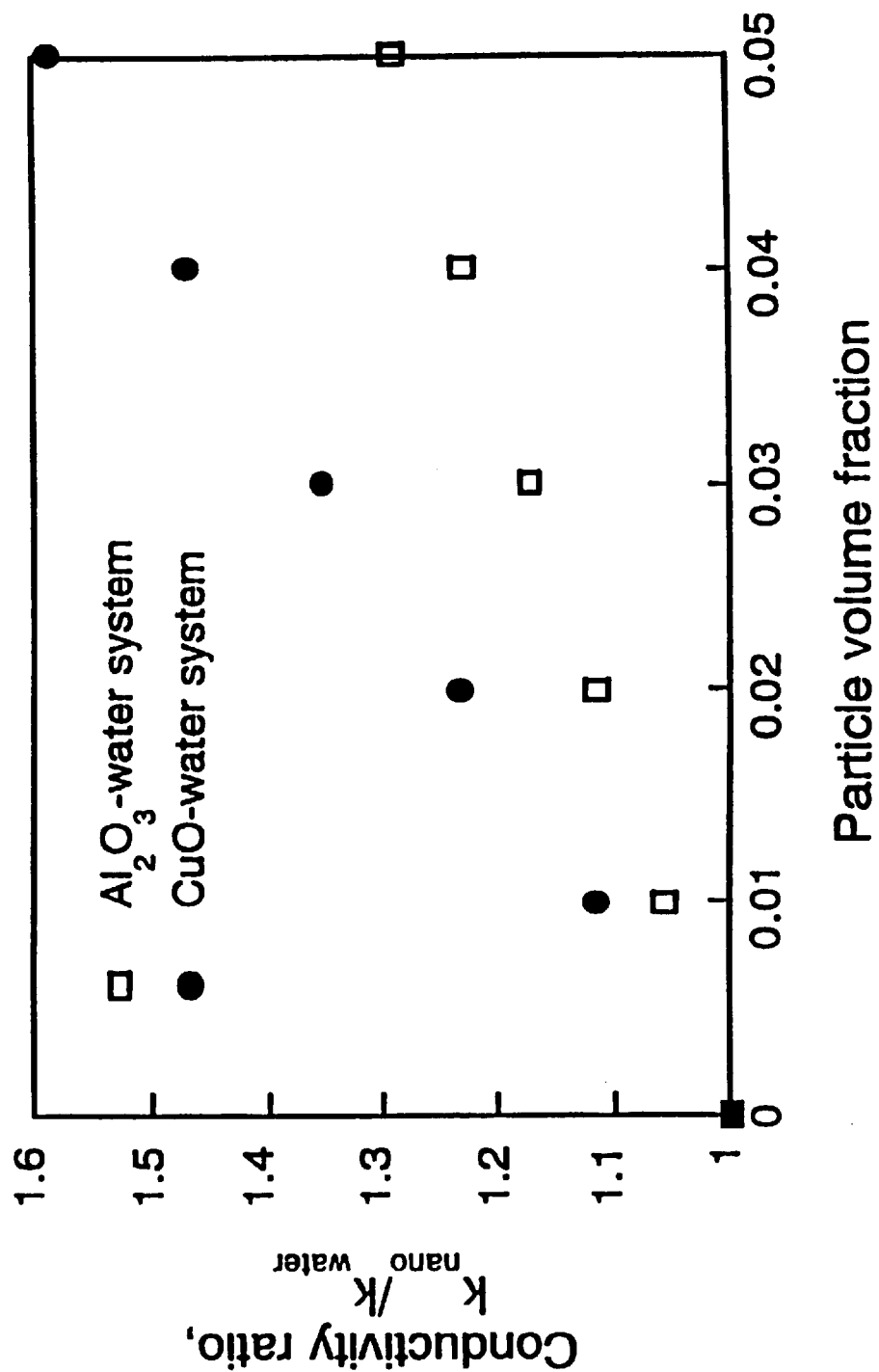
FIG. 7 is a plot of conductivity as a function of particle volume in deionized water.
Figure 8:
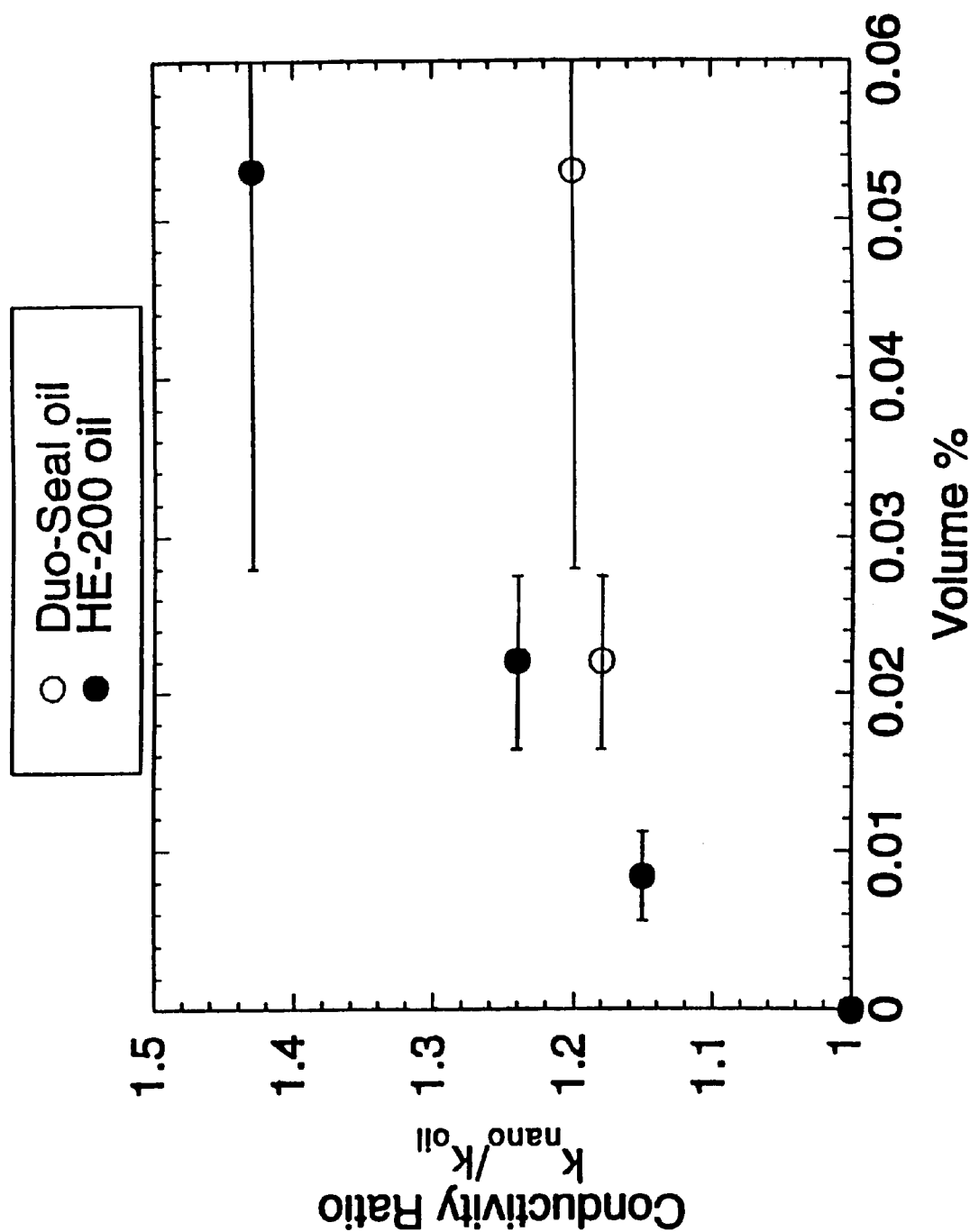
FIG. 8 is a plot of conductivity as a function of volume percent of copper in oil.

FIG. 7 is a plot of conductivity as a function of particle volume in deionized water containing aluminum oxide and water and FIG. 8 is a plot of conductivity as a function of volume percent of copper in two different kinds of oil. HE-200 is a high-purity oil designed for use in pumps such as Roots blowers and the like. Both FIG. 7 and FIG. 8 show that the conductivity of the liquid increases dramatically as the particle volume fraction is increased.

We have also tried adding thioglycolic acid as a stabilizing agent. Approximately 3% acid was added to Cu-in-ethylene glycol nanofluids after completing the VEROS procedure. The addition of 3% thioglycolic acid (upside-down triangle symbols) results in a major improvement in thermal conductivity compared to Cu-in-ethylene glycol nanofluids prepared without adding acid (open square symbols). There are several possible explanations for this behavior. First, it is possible that, without acid, some of the Cu nanoparticles settle. The black color of the nanofluid makes it difficult to determine if this happens. Second, it is possible that the acid attacks the Cu nanoparticles and reduces their size, which could improve the behavior as described below.

As mentioned above, the VEROS technique is limited to use with fluids that have sufficiently low vapor pressures to avoid vaporization of the fluid and subsequent gas-condensation and agglomeration of the particles. Because of this, the VEROS technique does not work with high-vapor-pressure fluids such as water. We have also developed a new technique for dispersing non-agglomerated nanoparticles into high-vapor-pressure fluids. Again this would be used to disperse metals into fluids. A schematic of this technique is shown in FIG. 3. Essentially, our idea is to use a Venturi pump to entrain nanoparticles into a gas stream that is then bubbled through the fluid to "offload" the particles into the fluid. The particles are produced by gas condensation in an actively pumped system that prevents significant particle agglomeration. We have done some testing of such a system and demonstrated that nanoparticles can be entrained into a gas stream using a Venturi.

While preferred embodiments have been shown and described, it should be understood that changes and modifications can be made therein without departing from the invention in its broader aspects. Various features of the invention are defined in the following claims.

What is claimed is:

1. A method of increasing conductivity of a liquid comprising the steps of:
   forming non-agglomerated nanocrystalline particles;
   producing a nanofluid by dispersing the nanocrystalline particles by direct evaporation into a low vapor pressure liquid; and
   adding a thioglycolic acid as a stabilizing agent to the nanofluid.

2. The method of claim 1, wherein the nanocrystalline particles are selected from the group consisting of copper particles, copper oxide particles and aluminum oxide particles.

3. The method of claim 2, wherein the nanocrystalline particles are added to the nanofluid within a particle volume fraction range of about 0.01 to 0.05.

4. The method of claim 1, wherein the low vapor pressure liquid comprises one of ethylene glycol and a pump oil.

5. The method of claim 1, wherein the amount of thioglycolic acid added to the nanofluid is approximately 3 percent.

6. The method of claim 1, wherein the direct evaporation of the nanocrystalline particles into the low vapor pressure liquid is accomplished through vacuum evaporation.

* * * * *

UNITED STATES PATENT AND TRADEMARK OFFICE
CERTIFICATE OF CORRECTION

PATENT NO. : 6,221,275 B1  
DATED : February 24, 2001  
INVENTOR(S) : Choi et al.

Page 1 of 1

It is certified that error appears in the above-identified patent and that said Letters Patent is hereby corrected as shown below:

<u>Column 1,</u>  
Line 17, "it is" should be -- its --.  
Line 28, "oil, as shown in Table 1" should be -- oil. --.

Signed and Sealed this

First Day of January, 2002

*Attest:*

JAMES E. ROGAN  
*Director of the United States Patent and Trademark Office*

*Attesting Officer*